(12) United States Patent
Inoue et al.

(10) Patent No.: US 8,044,129 B2
(45) Date of Patent: Oct. 25, 2011

(54) AQUEOUS BINDER FOR INORGANIC FIBER AND THERMAL AND/OR ACOUSTICAL INSULATION MATERIAL USING THE SAME

(75) Inventors: Akira Inoue, Chiyoda-ku (JP); Yuka Akiyama, Chiyoda-ku (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 676 days.

(21) Appl. No.: 11/997,487

(22) PCT Filed: Aug. 25, 2006

(86) PCT No.: PCT/JP2006/317281
§ 371 (c)(1),
(2), (4) Date: Jan. 31, 2008

(87) PCT Pub. No.: WO2007/024020
PCT Pub. Date: Mar. 1, 2007

(65) Prior Publication Data
US 2010/0098947 A1    Apr. 22, 2010

(30) Foreign Application Priority Data

Aug. 26, 2005 (JP) .................. 2005-245112
Nov. 25, 2005 (JP) .................. 2005-340135

(51) Int. Cl.
*C08K 3/30* (2006.01)
(52) U.S. Cl. ..... 524/423; 428/375; 428/391; 428/411.1; 428/441; 442/172; 442/173; 442/180; 524/275; 524/276; 524/277; 524/475; 524/487
(58) Field of Classification Search .................. 442/172, 442/173, 180; 428/411.1, 441, 375, 391; 524/423, 475, 487, 275, 276, 277
See application file for complete search history.

(56) References Cited

U.S. PATENT DOCUMENTS

| | | | |
|---|---|---|---|
| 6,071,994 A * | 6/2000 | Hummerich et al. | 524/247 |
| 6,194,512 B1 * | 2/2001 | Chen et al. | 524/594 |
| 6,331,351 B1 | 12/2001 | Waters et al. | |
| 6,348,530 B1 * | 2/2002 | Reck et al. | 524/244 |
| 6,555,187 B1 | 4/2003 | Kitamura | |
| 7,384,881 B2 * | 6/2008 | Miller et al. | 442/180 |
| 7,399,818 B2 * | 7/2008 | Bromm et al. | 526/317.1 |

FOREIGN PATENT DOCUMENTS

| | | |
|---|---|---|
| EP | 583086 A1 * | 2/1994 |
| EP | 1 382 642 A1 | 1/2004 |
| FR | 2 429 821 | 1/1980 |
| JP | 6 184285 | 7/1994 |
| JP | 2000 508000 | 6/2000 |

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

Provided is an aqueous binder for inorganic fibers, which is formaldehyde-free, has excellent strength, and is suitable for use under conditions of weakly acidic to weakly basic, and by which a cured product composed of the binder having excellent strength is obtained, and an thermal and/or acoustical insulation material made of inorganic fiber using the same. The thermal and/or acoustical insulation material is molded by using an aqueous binder for inorganic fibers including: an acrylic resin with an acid value of 350 to 850 mgKOH/g; a crosslinking agent containing at least one dialkanolamine; and a curing accelerator, in which a molar ratio of the total number of the hydroxyl groups and imino groups in the crosslinking agent to the total number of carboxyl groups in the acrylic resin is 0.8:1 to 1.5:1, and in which pH of the binder is adjusted to 6.0 to 8.0 with a volatile basic compound.

13 Claims, No Drawings

US 8,044,129 B2

AQUEOUS BINDER FOR INORGANIC FIBER AND THERMAL AND/OR ACOUSTICAL INSULATION MATERIAL USING THE SAME

FIELD OF THE INVENTION

The present invention relates to; an aqueous binder for inorganic fibers, which is formaldehyde-free and can be preferably used for thermal and/or acoustical insulation materials composed of inorganic fiber such as glass wool or rock wool; and a thermal and/or acoustical insulation material made of inorganic fiber using the same.

BACKGROUND OF THE INVENTION

Heretofore, in thermal and/or acoustical insulation materials composed of an inorganic fiber such as glass wool or rock wool, phenol resin-based binders composed mainly of a phenol-formaldehyde resin (or a resol-type phenol resin) have been widely used as the binder that binds the fibers to each other. These phenol resin-based binders cure in a relatively short time upon heating to provide cured products having strengths. Therefore, thermal and/or acoustical insulation materials made of inorganic fiber using these are excellent in shape stability, thickness recovery when opened after compressed packaging, and resistance to bending, and the like.

However, when the phenol resin-based binder is used, formaldehyde is released in the air in the manufacturing process of the product, predominantly during curing of the binder. Accordingly, the treatment and/or handling of the released formaldehyde have been problematic. In recent times in particular, to attempt to decrease environmental loads, regulations by the law or the like have been necessitated controlling the amount of formaldehyde released in the air. Thus a thermal and/or acoustical insulation material made of inorganic fiber having less environmental loads is demanded and a number of proposals have been made.

For example, JP-A-06-184285 discloses a curable aqueous composition containing (a) a polyacid containing at least two carboxylate groups, acid anhydride groups, or salts thereof, (b) a polyol containing at least two hydroxyl groups, and (c) a phosphorus-containing accelerator, wherein a ratio of the equivalent of the carboxylate groups, acid anhydride groups, or salts to the equivalent of hydroxyl group is about 1/0.01 to about 1/3, and wherein about 35% or less of the carboxylate groups, acid anhydride groups, or salts thereof is neutralized with a nonvolatile base.

Further, U.S. Pat. No. 6,331,350 discloses a binder for glass fiber that includes a water-soluble composition containing a polycarboxylic acid polymer having a number average molecular weight of less than 5,000 and a polyol, wherein the pH of the binder is adjusted to less than 3.5.

Further, JP-A-2000-508000 discloses a formaldehyde-free aqueous binder that contains A) a polymer obtained by radical polymerization, the polymer containing 5 to 100 mass % of an ethylenically unsaturated acid anhydride or an ethylenically unsaturated dicarboxylic acid whose carboxylate groups can form an anhydrous group, and B) an alkanolamine having at least two hydroxyl groups.

Also, a number of binders for inorganic fibers that are composed mainly of the above-mentioned polycarboxylic acid have been proposed.

The above-mentioned polycarboxylate resin-based binder such as an acrylic resin-based binder has a property of low reactivity in a pH range of weakly acidic to weakly basic for the carboxyl group therein with the hydroxyl group in polyols used as crosslinking agents, therefore an esterification reaction is difficult to sufficiently proceed. As a result, the crosslinking reaction of the binder is hard to be completed. Thus, when the above-mentioned binder is adjusted to a pH ranging weakly acidic to weakly basic, various physical properties of the thermal and/or acoustical insulation material made of inorganic fiber tend to be deteriorated. For example, physical properties of shape recovery and/or resistance to bending tend to be deteriorated due to the deterioration of the binder under at high humidity. For this reason, the acrylic resin-based binder is not suited for use under a pH condition ranging weakly acidic to weakly basic. Usually, the acrylic resin-based binder is employed by adjusting the pH thereof to a strongly acidic pH raging about 3 to thereby promote the crosslinking reaction. However, in such a case, manufacturing equipments such as a binder feeding pipe, a spraying apparatus, a mesh conveyor for deposition of inorganic fibers tend to be corroded with the acids and hence there arises a problem that the maintenance of the apparatuses as well as the apparatuses themselves are costly. There also arises a problem that the disposal of strongly acidic waste discharged is costly.

Further, the crosslinking of the above-mentioned acrylic resin-based binder is created with ester bonds. In the case of inorganic fibers, glass fibers in particular, this causes a problem that the alkali metal component in the glass is eluted in a form of alkali ion due to the moisture in the air and then the alkali ion hydrolyzes ester bonds at the crosslinked portions of the binder, thus deteriorating the binder's binding force for the fibers.

Therefore, it is an object of the present invention to provide; an aqueous binder for inorganic fibers, which is formaldehyde-free, has excellent strength, and is suitable for use under conditions of pH ranging weakly acidic to weakly basic, and whereby a cured product composed of the binder having excellent strength even when used after a period of time is obtained; and a thermal and/or acoustical insulation material made of inorganic fiber using the same.

SUMMARY OF THE INVENTION

In order to achieve the above-mentioned object, the present invention provides an aqueous binder for inorganic fibers, comprising:

an acrylic resin with an acid value of 350 to 850 mgKOH/g;

a crosslinking agent comprising at least one dialkanolamine; and a curing accelerator, wherein the molar ratio of the total number of hydroxyl groups and imino groups in the crosslinking agent to the total number of carboxyl groups in the acrylic resin is 0.8:1 to 1.5:1, and wherein the pH of the binder is adjusted to 6.0 to 8.0 with a volatile basic compound.

The aqueous binder for inorganic fibers according to the present invention is a formaldehyde-free binder composed of an acrylic resin and hence the binder can be cured without releasing any formaldehyde therefrom upon its heat-curing. This can decrease the environmental loads caused by gases and the like to be exhausted from manufacturing processes. By combination of an acrylic resin with an acid value of 350 to 850 mgKOH/g and a dialkanolamine, heat-curing can proceed relatively rapidly even under conditions of pH ranging weakly acidic to weakly basic, for example, in a range of pH 6.0 to 8.0, and the crosslinking reaction due to imidation and esterification reactions can be sufficiently improved, so that crosslinks can be made denser. Further, by setting the molar ratio of the total number of hydroxyl groups and imino groups in the crosslinking agent to the total number of carboxyl groups in the acrylic resin is 0.8:1 to 1.5:1, the acrylic resin and the crosslinking agent can react with each other in just proportion, so that a strong cured product composed of the binder can be obtained, and that the thermal and/or acoustical insulation material made of inorganic fiber using the binder does not get worse in each of various physical properties. In addition, since the aqueous binder for inorganic fibers according to the present invention is suitable for use under conditions of pH ranging weakly acidic to weakly basic, there occurs no corrosion of manufacturing equipment with acids as experienced with the above-mentioned conventional art, so that cost for maintenance, apparatus, treatment of waste solution, and the like can be lowered.

In the aqueous binder for inorganic fibers of the present invention, it is preferable that the acrylic resin has a weight average molecular weight of 1,000 to 15,000, or that the acrylic resin is a mixture of an acrylic resin (A) having a weight average molecular weight of 1,000 to 4,000 and an acrylic resin (B) having a weight average molecular weight of 8,000 to 20,000.

When the weight average molecular weight of the acrylic resin is 1,000 to 15,000, the increase in viscosity of the binder can be suppressed, so that the flowability of the binder when spraying and/or before the start of the curing reaction can be increased, and that the crosslinking of the binder can become denser to increase the strength of the obtained cured product composed of the binder, thereby making the binding for the fibers, as adhesive forces, stronger.

Further, when the acrylic resin is a mixture of an acrylic resin (A) having a weight average molecular weight of 1,000 to 4,000 and an acrylic resin (B) having a weight average molecular weight of 8,000 to 20,000, the control of the flowability of the binder becomes easier, so that optimization can be easily achieved in the balance between (i) flowability of the binder on the surface of the inorganic fiber and (ii) prevention of dropping off of the binder from the surface of the inorganic fiber and/or of non-uniform deposition of the binder because of flowing upon collection of fibers in the process of producing a thermal and/or acoustical insulation material made of inorganic fiber, thereby improving uniformity in each of various physical properties in the thermal and/or acoustical insulation material made of inorganic fiber the inorganic fiber using the binder.

It is preferable that the aqueous binder for inorganic fibers according to the present invention further comprises an aqueous dispersion of one selected from a wax or a wax mixed with a heavy base oil, wherein the amount in terms of solid content of the aqueous dispersion contained in the binder is 0.1 to 5 parts by mass per a total of 100 parts by mass of the acrylic resin and the crosslinking agent.

The wax as well as the wax mixed with the heavy base oil serves as a mold release agent for avoiding attachment to manufacturing equipments when producing the thermal and/or acoustical insulation material made of inorganic fiber, an agent for dust-proof and/or a water repellent agent. In particular, since the acrylic resin-based binders as compared with phenol resin-based binders exhibit good adhesion to metals, the binder tends to attach along with the inorganic fibers to a metal-made conveyor or the like upon curing of the binder, which may deteriorate manufacturing productivity. Use of the wax or the wax mixed with the heavy base oil imparts mold releasability to the binder, thereby preventing the above-mentioned problem.

Further, it is preferable that the aqueous binder for inorganic fibers according to the present invention further comprises a silane coupling agent, wherein the amount of the silane coupling agent contained in the binder is 0.1 to 2.0 parts by mass per a total of 100 parts by mass of the acrylic resin and the crosslinking agent.

In this embodiment, the silane coupling agent increases adhesion at the interface between inorganic fiber and binder, so that each of various physical properties in the obtained thermal and/or acoustical insulation material made of inorganic fiber using the binder can be improved.

Further, it is preferable that the aqueous binder for inorganic fibers according to the present invention further comprises an ammonium salt of an inorganic acid.

In this embodiment, by inclusion of the ammonium salt of the inorganic acid, heating in the step of curing the binder allows an ammonium ion to evaporate as ammonia and an acid to remain in the binder, which neutralizes the alkaline component that is eluted from the inorganic fiber, so that the crosslinked portions in the binder can be prevented from being hydrolyzed, and that each of the various physical properties in a thermal and/or acoustical insulation material made of inorganic fiber can be maintained for a long period of time.

In the aqueous binder for inorganic fibers of the present invention, the ammonium salt of the inorganic acid is preferably ammonium sulfate. In this embodiment, ammonium sulfate does not have a delaying effect on the crosslinking reaction when the binder is cured and causes rapid neutralization of the alkaline component eluted from the inorganic fiber to proceed, so that the hydrolysis of the cured product composed of the binder caused by the alkali can be prevented.

On the other hand, the present invention also provides a thermal and/or acoustical insulation material made of inorganic fiber, comprising a molded composite of an inorganic fiber, the composite comprising the aforementioned aqueous binder for inorganic fibers according to the present invention, wherein the binder is imparted to the inorganic fiber in the composite, the binder on the inorganic fiber being cured by heating.

According to the thermal and/or acoustical insulation material made of inorganic fiber in the present invention, discharged formaldehyde upon manufacturing, which gives undesirable effects on the environment, is avoided or reduced, so that a thermal and/or acoustical insulation material made of inorganic fiber with less environmental loads which is not worsen in physical properties compared with conventional ones can be obtained.

In summary, the present invention gives the following effects.

The aqueous binder for inorganic fibers according to the present invention is a formaldehyde-free binder composed of an acrylic resin and hence the binder can be cured without releasing any formaldehyde therefrom upon its heat-curing. This can decrease the environmental loads caused by gases and the like to be exhausted from manufacturing processes. By combination of an acrylic resin with an acid value of 350 to 850 mgKOH/g and a dialkanolamine, heat-curing can proceed relatively rapidly even under conditions of pH ranging weakly acidic to weakly basic, for example, in a range of pH 6.0 to 8.0, and the crosslinking reaction due to imidation and esterification reactions can be sufficiently improved, so that crosslinks can be made denser. Further, by setting the molar ratio of the total number of hydroxyl groups and imino groups in the crosslinking agent to the total number of carboxyl groups in the acrylic resin is 0.8:1 to 1.5:1, the acrylic resin and the crosslinking agent can react with each other in just proportion, so that a strong cured product composed of the binder can be obtained, and that the thermal and/or acoustical insulation material made of inorganic fiber using the binder does not get worse in each of various physical properties. In addition, since the aqueous binder for inorganic fibers according to the present invention is suitable for use under conditions of pH ranging weakly acidic to weakly basic, there occurs no corrosion of manufacturing equipment with acids as experienced with the above-mentioned conventional art, so that cost for maintenance, apparatus, treatment of waste solution, and the like can be lowered.

Further, in an embodiment in which the aqueous binder for inorganic fibers according to the present invention further contains an ammonium salt of an inorganic acid, heating in the step of curing the binder allows an ammonium ion to evaporate as ammonia and an acid to remain in the binder, which neutralizes the alkaline component that is eluted from the inorganic fiber, so that the crosslinked portions in the binder can be prevented from being hydrolyzed, and that each of the various physical properties in a thermal and/or acoustical insulation material made of inorganic fiber can be maintained for a long period of time.

In addition, the thermal and/or acoustical insulation material made of inorganic fiber in the present invention that can be obtained by using the aqueous binder for inorganic fibers according to the present invention exhibits similar physical properties to those in materials obtained by using conventional phenol-based binders, without causing, due to environmental conditions such as temperature and humidity, a decrease in thickness of the material that relates to a property of thermal and/or acoustical insulation and a decrease in rigidity that relates to a property of self-supporting upon construction. It can be advantageously used as a thermal insulation material or an acoustical insulation material for houses, buildings, and the like or a core material for a vacuum heat insulation material.

DETAILED DESCRIPTION OF EMBODIMENTS OF THE INVENTION

The aqueous binder for inorganic fibers according to the present invention is a water-soluble composition that includes an acrylic resin with an acid value of 350 to 850 mgKOH/g, a crosslinking agent containing at least one dialkanolamine, and a curing accelerator.

In a preferable embodiment of the aqueous binder for inorganic fibers according to the present invention, the water-soluble composition further contains an ammonium salt of an inorganic acid.

The acrylic resin to be used in the aqueous binder for inorganic fibers according to the present invention is obtained by polymerization of one or more monomers selected from ethylenically unsaturated carboxylic acid monomers.

Examples of the ethylenically unsaturated carboxylic acid monomer include acrylic acid, methacrylic acid, crotonic acid, fumaric acid, maleic acid, 2-methylmaleic acid, itaconic acid, 2-methylitaconic acid, α,β-methyleneglutaric acid, monoalkyl maleate, monoalkyl fumarate, maleic anhydride, acrylic anhydride, β-(meth)acryloyloxyethylene hydrogen phthalate, β-(meth)acryloyloxyethylene hydrogen maleate, and β-(meth)acryloyloxyethylene hydrogen succinate. In view of ease of controlling the molecular weight of the acrylic resin, it is preferable to use acrylic acid. When the acid value of the acrylic resin is adjusted in a high region of 700 mgKOH/g or more, it is preferable to use maleic acid or fumaric acid.

Further, in adjusting the acid value of the acrylic resin, ethylenically unsaturated monomers that contain no carboxyl group can be used in combination with the above-mentioned ethylenically unsaturated carboxylic acids.

Examples of the ethylenically unsaturated monomer that contains no carboxyl group include: acryl-based monomers such as methyl(meth)acrylate, ethyl (meth)acrylate, n-butyl (meth)acrylate, isobutyl(meth)acrylate, t-butyl(meth)acrylate, 2-ethylhexyl(meth)acrylate, cetyl(meth)acrylate, n-stearyl(meth)acrylate, diethylene glycol ethoxy(meth)acrylate, methyl-3-methoxy(meth)acrylate, ethyl-3-methoxy (meth)acrylate, butyl-3-methoxy(meth)acrylate, cyclohexyl (meth)acrylate, benzyl (meth)acrylate, isobonyl(meth)acrylate, tetrahydrofurfuryl acrylate, 2-hydroxyethyl acrylate, 2-hydroxypropyl acrylate, 4-hydroxybutyl acrylate, mono (meth)acrylate of polyol that is trivalent or more, aminoalkyl (meth)acrylate, N-alkylaminoalkyl (meth)acrylate, and N,N-dialkylaminoalkyl(meth)acrylate; vinyl-based monomers such as vinyl alkyl ether, N-alkylvinylamine, N,N-dialkylvinylamine, N-vinylpyridine, N-vinylimidazole, and N-(alkyl) aminoalkylvinylamine; amide-based monomers such as (meth)acrylamide, N-alkyl(meth)acrylamide, N,N-dialkyl (meth)acrylamide, N,N-dialkyl aminoalkyl(meth)acrylamide, diacetone (meth)acrylamide, N-vinylformamide, N-vinylacetamide, and N-vinylpyrolidone; aliphatic unsaturated hydrocarbons such as ethylene, propylene, isobutylene, isoprene, and butadiene; styrene-based monomers such as styrene, α-methylstyrene, p-methoxystyrene, vinyltoulene, p-hydroxystyrene, and p-acetoxystyrene; vinylester-based monomers such as vinyl acetate and vinyl propionate; acrylonitrile; and glycidyl(meth)acrylate. Any of them may be used singly, or two or more of them may be used in combination. It is noted, however, that N-methylol (meth)acrylamide and methyl-N-methylol (meth)acrylamide are avoided to be used for an acryl-based resin of the present invention because they yield a cross-liking reaction and release formaldehyde when they are heated.

The acid value of the acrylic resin must be 350 to 850 mgKOH/g, preferably 450 to 750 mgKOH/g, and more preferably 550 to 750 mgKOH/g. If the acid value of the acrylic resin is less than 350 mgKOH/g, a cured product obtained by subjecting the aqueous binder to heat-curing has a rough crosslinked structure, so the cured product composed of the binder tends to have decreased strength and rigidity. Therefore, the obtained thermal and/or acoustical insulation material made of inorganic fiber has a decreased thickness-recovering ability when opened after compressed packaging thereof (hereinafter, referred to as "property of recovering") and decreased rigidity required to serve as a board. With such materials, the capability of thermal insulation, acoustical insulation, or self-supporting, that is, the workability upon construction may be deteriorated. On the other hand, if the acid value of the acrylic resin is more than 850 mgKOH/g, the crosslinked structure after the binder is cured becomes too dense so that the binder tends to become brittle. Accordingly, when such binder is used as a binder for a thermal and/or acoustical insulation material made of inorganic fiber, the binder may have only a performance that does not reach a desired one. Also, the resultant material, unused carboxyl groups remaining in the cured product after the curing, for example, may absorb moisture at high humidity, thus causing a problem of a decrease in binding force for the fibers to each other. Note that in the present invention, the acid value of the acrylic resin is expressed as number of milligrams of potassium hydroxide that is required to neutralize one gram (1 g) of the acrylic resin.

In the present invention, the acrylic resin preferably is 1) an acrylic resin that has a weight average molecular weight of 1,000 to 15,000, or 2) a mixture of an acrylic resin (A) having a weight average molecular weight of 1,000 to 4,000 and an acrylic resin (B) having a weight average molecular weight of 8,000 to 20,000.

In the case of the above item 1), that is, the case where the weight average molecular weight is 1,000 to 15,000, the weight average molecular weight of the acrylic acid is preferably 2,000 to 10,000 and particularly preferably 2,000 to 4,000. If the weight average molecular weight of the acrylic acid is above 15,000, a considerable increase in viscosity of the binder occurs with evaporation of water content after application of the binder, and the flowability of the binder tends to be deteriorated when or after the application of the binder to the inorganic fibers, thus making the binder difficult to be applied to the inorganic fibers uniformly. Also, the binder attached to the inorganic fibers tends to be highly adhesive. If the adhesion of the binder attached to the inorganic fibers is high, the fiber having the binder attached thereon tends to stick to the manufacturing equipment. In some case, an attachment to the manufacturing equipment may occur as agglomeration of contaminants in the manufacturing line and/or fibers derived from the surface of the thermal and/or acoustical insulation material to be a product, which in turn causes a problem of deterioration of appearance of the obtained product, and a partial shortage of thickness of the obtained product. On the other hand, if the weight average molecular weight of the acrylic resin is less than 1,000, the binder components tend to be evaporated as fume by the heating upon curing, so that the amount of the binder to be attached to the inorganic fibers tends to be decreased. Accordingly, each of the various physical properties in the obtained thermal and/or acoustical insulation material made of inorganic fiber using the binder may be deteriorated. Since such binder necessitates decreasing the degree of polymerization at the time of polymerizing the acrylic resin in producing of the material, it may result in generation of another environmental loads, where the ethylenically unsaturated monomer tends to remain and develops odor.

When the weight average molecular weight of the acrylic polymer is within the above-mentioned range, the viscosity of the aqueous binder for inorganic fibers is easy to be adjusted and the flowability of the binder can be made good when or after the binder is applied to the inorganic fibers, so that fluctuation in the amount of the binder to be attached to the inorganic fibers can be prevented. Further, in the production of the thermal and/or acoustical insulation material made of inorganic fiber, the step of applying the binder to the fibers is in many cases performed in a high temperature atmosphere of about 200 to 350° C. immediately after fiberization by a centrifugal forming method or the like. In such atmosphere, when the weight average molecular weight of the acrylic polymer is within the above-mentioned range, the favorable evaporation of water content in the binder can be performed.

The weight average molecular weight of the acrylic resin relates not only to the flowability of the binder but also to the crosslink density after curing. Although the acrylic resins have the same acid value, if they differ in molecular weight, the cured products composed of the binders vary in strength, so that the obtained thermal and/or acoustical insulation materials have different physical properties from each other. For example, as the weight average molecular weight of the acrylic resin decreases, the cured products composed of the binder tends to become brittle and in some cases the desired physical properties cannot be obtained. On the other hand, if the weight average molecular weight of the acrylic resin is within the above-mentioned range, an optimization of the balance between (i) the flowability of the binder and (ii) each of the various physical properties of the obtained thermal and/or acoustical insulation material made of inorganic fiber can be easily achieved.

Further, when the acrylic resin is in the case of the above item 2), that is, when the acrylic resin is a mixture of an acrylic resin (A) having a weight average molecular weight of 1,000 to 4,000 and an acrylic resin (B) having a weight average molecular weight of 8,000 to 20,000, the mass ratio of the acrylic resin (A) to the acrylic resin (B) is preferably 60:40 to 90:10, and more preferably 75:25 to 90:10.

The lowering of the molecular weight of the acrylic resin improves the flowability of the binder, but it may also cause a problem of dropping off of the binder from the surface of the inorganic fibers due to a suction unit for depositing the fibers in the step of collecting fibers after fiberization of the inorganic fibers and application of the binder, or a problem that the binder is biased to be attached on the downward side of the product due to its easiness to flow, or a occurrence that the binder is biased to be attached on the downward and/or upward side due to flow of the binder immediately before curing under the influence of hot air in a curing oven. Further, an optimization that involves employing one kind of acrylic resin with a relatively large weight average molecular weight is also conceivable. However, the increase in weight average molecular weight of the acrylic resin tends to result in a decreased curing rate of the binder and to cope with this, it is necessary to make the time period for curing the binder longer or to increase curing temperature, so that the productivity may be deteriorated or the economic efficiency may be decreased.

By using two different kinks of acrylic resin having different weight average molecular weights, that is, a combinational use of the above-mentioned acrylic resin (A) and the above-mentioned acrylic resin (B), fluctuation in the amount of the binder to be attached to the inorganic fibers in the thermal and/or acoustical insulation material made of inorganic fiber, caused by the flow of the binder occurring in the step of collecting the fibers and in the subsequent steps, can be prevented without lowering the curing rate of the binder.

The crosslinking agent used in the aqueous binder for inorganic fibers according to the present invention is a crosslinking agent that contains at least one dialkanolamine.

Under strongly acidic conditions, the reaction between hydroxyl groups and carboxyl groups proceeds at a sufficiently rapid rate, so that polyol is not particularly limited and various polyols can be used. On the other hand, under weakly acidic to weakly basic conditions, the reaction between carboxyl groups and hydroxyl groups proceeds moderately, so that crosslinking reaction is difficult to proceed. Accordingly, carboxyl groups and hydroxyl groups tend to remain in the cured product composed of the binder, and thus each of the various physical properties of the material tends to be poor when used as an thermal and/or acoustical insulation material made of inorganic fiber.

On the other hand, the dialkanolamine is a polyol that has one imino group and two primary hydroxyl groups. When the reactivity with a carboxyl group is compared between the imino group and the hydroxyl group, the imino group tends to react faster than the hydroxyl group.

Therefore, by using a dialkanolamine as a crosslinking agent, the reactivity with a carboxyl group can be improved and the reactivity with a carboxyl group under weakly acidic to weakly basic conditions can be optimized.

Examples of the dialkanolamine that can be used in the present invention include diethanolamine and diisopropanolamine. From the economical viewpoint, diethanolamine is particularly preferable.

The aqueous binder for inorganic fibers according to the present invention may include as a crosslinking agent a polyol other than the dialkanolamine in combination with the dialkanolamine.

The above-mentioned polyol is not particularly limited but is preferably a water-soluble polyol, and specific examples thereof include aliphatic polyols such as 1,2-ethanediol (ethylene glycol) and dimers or trimers thereof, 1,2-propanediol (propylene glycol) and dimers or trimers thereof, 1,3-propanediol, 2,2-methyl-1,3-propanediol, 2-butyl-2-ethyl-1,3-propanediol, 1,3-butanediol, 1,4-butanediol, 2-methyl-2,4-butanediol, 1,5-pentanediol, 3-methyl-1,5-pentanediol, 2-methyl-2,4-pentanediol, 1,6-hexanediol, 1,4-cyclohexanediol, 2-ethyl-1,3-hexanediol, 2-hydroxymethyl-2-methyl-1,3-propanediol, 2-ethyl-2-hydroxymethyl-2-methyl-1,3-propandediol, 1,2,6-hexanetriol, and 2,2-bis(hydroxymethyl)-2,3-propanediol; trialkanolamines such as triethanolamine and triisopropanolamine; saccharides such as glucose, fructose, mannitol, sorbitol, and maltitol; polyester polyols obtained from the above polyols with phthalic acid, adipic acid, azelaic acid, or the like; polyethylene glycols; polypropylene glycols; and acrylic resin-based polyols. Any of them may be used singly, or two or more of them may be used in combination. Of those, trialkanolamines are preferable because they have high boiling points and scarcely sublimate.

In a combination of a dialkanolamine and a polyol, the content of the polyol in the crosslinking agent is not particularly limited and can be adjusted as appropriate depending on pH of the aqueous binder for inorganic fibers to be used. The content of the polyol is preferably less than 200 parts by mass, and more preferably less than 100 parts by mass, per 100 parts by mass of the dialkanolamine. If the content of the polyol in the crosslinking agent is less than 200 parts by mass per 100 parts by mass of the dialkanolamine, the crosslinking reaction of the binder proceeds sufficiently even under weakly acidic to weakly basic conditions.

In the aqueous binder for inorganic fibers according to the present invention, the acrylic resin and the crosslinking agent must be included such that the molar ratio of the total number of hydroxyl groups and imino groups in the crosslinking agent to the total number of carboxyl groups in the acrylic resin is 0.8:1 to 1.5:1, preferably 0.9:1 to 1.2:1, and more preferably 0.95:1 to 1.1:1. If the above-mentioned molar ratio is less than 0.8:1, the carboxyl groups in the acrylic resin remain after the curing of the binder. On the other hand, if the molar ratio is above 1.5:1, the dialkanolamines in the crosslinking agent remain after the curing of the binder. Accordingly, the obtained thermal and/or acoustical insulation material made of inorganic fiber has physical properties deteriorated due to environmental factors such as its moisture resistance, and exhibits poor economic efficiency because an excess portion of acrylic resin or dialkanolamine tends to be generated to be left.

When the molar ratio of the total number of hydroxyl groups and imino groups in the crosslinking agent to the total number of carboxyl groups in the acrylic resin is within the above-mentioned range, the acrylic resin and the crosslinking agent in just proportion can form crosslinked structures upon curing of the binder, so that the cured product composed of the binder has a high strength, and each of the various physical properties of the obtained thermal and/or acoustical insulation material made of inorganic fiber can be optimized.

The curing accelerators used in the aqueous binder for inorganic fibers according to the present invention include those that promote the imidation reaction or esterification reaction between the carboxyl groups in the above-mentioned acrylic resin and the imino groups or hydroxyl groups in the above-mentioned dialkanolamine, which are preferably water-soluble.

Examples of such a curing accelerator include: hypophosphites such as sodium hypophosphite, potassium hypophosphite, calcium hypophosphite, and magnesium hypophosphite; organic phosphorus compounds such as tris(3-hydroxypropyl)phosphine; quaternary phosphonium salts such as a tetraethylphosphonium salt, a triethylbenzylphosphonium salt, a tetra-n-butylphosphonium salt, and a tri-n-butylmethylphosphonium salt; Lewis acid compounds such as a boron trifluoride amine complex, zinc chloride, aluminum chloride, and magnesium chloride; and water-soluble organometal compounds such as titanium lactate, titanium triethanolaminate, and zirconyl acetate. Any of those may be used singly, or two or more of them may be used in combination. Of those, calcium hypophosphite and tris(3-hydroxypropyl)phosphine are preferable since they have a high curing acceleration effect even in small amounts and since they do not deteriorate the humidity resistance of the cured binder product if they remain therein.

The content of the curing accelerator in terms of solid content is preferably 0.1 to 10 parts by mass, and more preferably 0.5 to 5 parts by mass per a total of 100 parts by mass of the acrylic resin and the crosslinking agent.

The aqueous binder for inorganic fibers according to the present invention forms imido bonds or ester bonds when the acrylic resin is crosslinked with the dialkanolamine. Since those bonds are hydrolyzed by the alkaline component eluted from the inorganic fibers, the binding force of the binder to bind the inorganic fibers to each other may be decreased when the thermal and/or acoustical insulation material made of inorganic fiber is used for a long period of time.

Furthermore, it is preferable that the aqueous binder for inorganic fibers according to the present invention further contains an ammonium salt of an inorganic acid.

That is, the ammonium salt of the inorganic acid remains as an acid in the binder by heating in the step of curing since the binder ammonium ions evaporate as ammonia, so the inclusion of the ammonium salt of an inorganic acid can neutralize the alkaline components eluted from the inorganic fibers. As a result, the hydrolysis at the crosslinked portions of the binder can be prevented, so that each of the various physical properties of the thermal and/or acoustical insulation material made of inorganic fiber can be maintained for a long period of time.

Examples of the ammonium salt of the inorganic acid include: ammonium sulfate, ammonium nitrate, ammonium sulfite, ammonium phosphate, ammonium metaphosphate, ammonium phosphite, ammonium hypophosphite, ammonium polyphosphate, ammonium chloride, diammonium hydrogenphosphate, ammonium dihydrogenphosphate, ammonium hydrogencarbonate, ammonium thiosulfate, ammonium hyposulfite, ammonium chlorate, ammonium peroxodisulfate, and aluminum ammonium sulfate. Ammonium sulfate is preferable because it does not provide basicity after an alkaline component is neutralized and is capable of inhibiting hydrolysis of a binder with a small content.

The content of the ammonium salt of an inorganic acid is preferably 0.1 to 5 parts by mass, and more preferably 1 to 3 parts by mass, per a total of 100 parts by mass of the acrylic resin and the crosslinking agent. The content of the ammonium salt of an inorganic acid of less than 0.1 parts by mass is insufficient for the neutralization of the eluted alkaline component while the content of the ammonium salt of an inorganic acid of more than 5 parts by mass is excessive for neutralizing the eluted alkaline component and is undesirable since the water resistance of the cured product composed of the binder may in some cases be deteriorated.

In the aqueous binder for inorganic fibers according to the present invention, it is preferable to use an aqueous dispersion of at least one selected from a wax and a wax mixed with a heavy base oil.

In general, the acrylic resin gives good adhesion to metals as compared with phenol/formaldehyde-based resins, so during the step of curing the binder attached to inorganic fibers, the binder tends to be attached to equipment such as a conveyor and at the same time the inorganic fibers may in some cases be attached to the manufacturing equipment. This tends to generate unevenness on the surface of the obtained inorganic fiber product, thus deteriorating the appearance of the product. Further, cumbersome working at high temperatures become necessary to remove the mass or the like of inorganic fibers adhered to the manufacturing equipment, so that a problem tends to occur that the productivity is deteriorated. By blending a wax or a wax mixed with a heavy base oil in the binder, these components each serve as a mold release agent upon production of the thermal and/or acoustical insulation material made of inorganic fiber, solving the problems. Further, at the same time, the wax as well as the wax mixed with the heavy base oil can remain in the cured product composed of the binder to improve the water repellency of the thermal and/or acoustical insulation material.

The wax refers to, though not a strict definition, a substance that is solid at room temperature and when heated to about 40° C. or more, becomes a liquid that has a relatively high flowability. Specific examples thereof include: animal waxes such as beeswax, lanolin wax, and shellac wax; plant waxes such as carnauba wax, Japan wax, rice wax, and candelilla wax; mineral waxes such as montan wax and ozocerite; petroleum waxes such as paraffin wax and microcrystalline wax; and synthetic waxes such as Fischer-Tropsch wax, polyethylene wax, polypropylene wax, polycarbonate wax, coconut oil fatty acid esters, tallowate esters, stearic acid amide, diheptadecyl ketone, and hardened castor oil. Any of them may be used singly, or two or more of them may be used in combination. Of those, paraffin wax, polyethylene wax, and polypropylene wax are preferable from economical viewpoints.

Heavy base oils each constituted by paraffin or naphthene which is an aliphatic hydrocarbon having approximately 15 to 120 carbon atoms are used. The heavy base oils have similar chemical structures to those of waxes and have high flowability, so that they can serve also as a plasticizer for the waxes. Therefore, the heavy base oils can increase the flowability of the wax upon heating for curing of the aqueous binder, and can uniformly apply the wax and heavy base oil on the inorganic fibers, so that fluctuation of the mold releasability or water repellency of the thermal and/or acoustical insulation material made of inorganic fiber can be decreased.

Heavy base oils are classified by viscosity and those having a Viscosity Grade (VG) in the range of 320 $mm^2$/s to 680 $mm^2$/s can be preferably used in the present invention. In heavy base oils having a relatively low viscosity, for example, a VG of less than 320 $mm^2$/s, those components having 30 or less carbon atoms, particularly 20 or less carbon atoms tend to increase in number. Those components tend to be evaporated upon heating when the binder is cured. On the other hand, when the viscosity of the heavy base oil is high, for example, a VG of more than 680 $mm^2$/s, it may take a long period of time for mixing the heavy base oil with a dispersant when the heavy base oil is emulsified, thus deteriorating the productivity.

When the wax and the heavy base oil are used in combination, the mass ratio of the wax to the heavy base oil is not particularly limited and is preferably wax:heavy base oil of 40:60 to 95:5. If the ratio of the heavy base oil is more than 60 mass %, the flowability of the water repellent agent at room temperature is increased, so that water repellency may in some cases be decreased after a long term use of the obtained thermal and/or acoustical insulation material made of inorganic fiber. On the other hand, if the ratio of the heavy base oil is less than 5 mass %, use of a wax having a high melting point decreases the plasticizing effect of the wax, so that the obtained thermal and/or acoustical insulation material made of inorganic fiber may show fluctuation in water repellency thereof. Therefore, it is more preferable that the ratio of the heavy base oil to be used be adjusted as appropriate depending on the melting point of the wax to be used or desired water repellent performance.

In general, the wax and heavy base oil are hydrophobic materials and hence when a wax or a wax mixed with a heavy base oil is added to the binder, it is preferable that it be dispersed or emulsified in water in advance in order to improve the miscibility.

The dispersant for dispersing the wax and the heavy base oil in water is not particularly limited and includes various surfactants or water-soluble resins. It is preferable that the kind and amount of the dispersant be set as appropriate.

The amount in terms of solid content of the aqueous dispersion of one selected from a wax or a wax mixed with a heavy base oil contained in the binder is 0.1 to 5 parts by mass, more preferably 0.5 to 3 parts by mass, and particularly preferably 0.5 to 2 parts by mass per a total of 100 parts by mass of the acrylic resin and the crosslinking agent. If the content of the wax or the wax mixed with the heavy base oil is less than 0.1 parts by mass, there is observed substantially no improvement in mold releasability and water repellency. On the other hand, if the content of the wax or the wax mixed with the heavy base oil is more than 5.0 parts by mass, the water repellency is not improved in proportion to the increase in the content, which is not economical and hence is not preferable.

Further, it is preferable that the aqueous binder for inorganic fibers according to the present invention further contain a silane coupling agent. The silane coupling agent acts on an interface between the inorganic fiber and the binder and is capable of increasing adhesion of the binder to the inorganic fiber.

Examples of the silane coupling agent to be used in the present invention include: amino silane coupling agents such as γ-aminopropyltriethoxysilane, γ-(2-aminoethyl) aminopropyltrimethoxysilane, and γ-(2-aminoethyl) aminopropylmethyldimethoxysilane; and epoxysilane coupling agents such as γ-glycidoxypropyltrimethoxysilane and γ-glycidoxypropylmethyldimethoxysilane. Any of them may be used singly, or two or more of them may be used in combination.

The content of the silane coupling agent is preferably 0.1 to 2.0 parts by mass per a total of 100 parts by mass of the acrylic resin and the crosslinking agent.

The aqueous binder for inorganic fibers according to the present invention may further be added with a dust-proof agent, a colorant, and the like as necessary.

The aqueous binder for inorganic fibers according to the present invention can be prepared by mixing the acrylic resin, crosslinking agent, and curing accelerator and optionally an aqueous dispersion of one selected from the wax or the wax mixed with the heavy base oil, silane coupling agent, and the like in a tank equipped with an agitator such as a dissolver.

The forms of the aqueous binder include an emulsion, a colloidal dispersion, and a water-soluble composition. Emulsions as well as colloidal dispersions have poor miscibility between dispersed resins and water, and has a characteristic that it tends to form a film when medium water is evaporated. If the resin composition in the binder forms a film before curing, the flowability of the binder on the surface of the inorganic fibers tends to be deteriorated, so that the thermal and/or acoustical insulation material made of inorganic fiber with a uniform amount of attached binder cannot be obtained. Also, in many portions there occurs a loss of binding for the fibers with the binder, so that it may be difficult to maintain shape as a product. Further, the colloidal dispersion or emulsion that once formed a film as a result of evaporation of medium water is difficult to return to an aqueous material, so that if the binder is attached to the manufacturing equipment and the like, washing becomes cumbersome and the productivity tends to be decreased.

On the other hand, when the aqueous binder is a water-soluble composition, the above-mentioned problems hardly occur since no film is formed due to evaporation of water. Therefore, it is preferable that the aqueous binder for inorganic fibers according to the present invention be prepared as a water-soluble composition.

Here, the term "emulsion" refers to a preparation that is obtained by emulsifying the resin component in an emulsifier other than the resin component, for example, a surfactant, while the term "colloidal dispersion" refers to a dispersion in which the resin component is dispersed in water by the effect of functional groups in the resin component. Both have an appearance of a milky white color. On the other hand, the term "water-soluble composition" refers to a preparation in which the resin component is completely dissolved in water and whose appearance is transparent or near transparent.

Further, it is necessary to adjust the pH of the aqueous binder for inorganic fibers to be a pH of 6.0 to 8.0, preferably 6.0 to 7.0, and more preferably 6.0 to 6.5 by using a volatile basic compound. If the pH of the aqueous binder for inorganic fibers is less than 6.0, the manufacturing equipment may be corroded after a long-term use. Further, cost is incurred for the disposal of wastewater. On the other hand, if the pH of the aqueous binder for inorganic fibers is more than 8.0, the crosslinking reaction in the binder becomes moderate so that the curing is not completed or heating for a long period of time is needed to complete the curing. This tends to deteriorate the productivity. This also tends to deteriorate each of various physical properties of such as property of recovering and property of self-supporting in the resultant thermal and/or acoustical insulation material made of inorganic fiber. When the pH of the aqueous binder for inorganic fibers is within the above-mentioned range, the corrosion of the manufacturing equipment can be prevented and the disposal of wastewater becomes easy, so that maintenance costs can be reduced.

The volatile basic compound to be used in the adjustment of pH includes ammonia water or amines. Taking into consideration odor that is generated upon curing, it is preferable to use ammonia water.

Further, the solid content of the aqueous binder for inorganic fibers is preferably 5 to 40 mass % and more preferably 10 to 30 mass %. If the solid content is less than 5 mass %, the amount of water is too much, so that the curing step may in some cases take a long period of time, thus deteriorating productivity. If the solid content is above 40 mass %, the viscosity is too high, so that the flowability of the binder is decreased.

Next, the thermal and/or acoustical insulation material made of inorganic fiber of the present invention is explained.

The thermal and/or acoustical insulation material made of inorganic fiber of the present invention is obtained by imparting the above-mentioned aqueous binder for inorganic fibers to inorganic fibers and molding them by subjecting the binder to heat-curing.

The thermal and/or acoustical insulation material made of inorganic fiber of the present invention can be produced, for example, as described below. That is, first a molten inorganic material is fiberized using a fiberizing apparatus and immediately thereafter, the above-mentioned aqueous binder for inorganic fibers is imparted to the inorganic fibers. Then, the inorganic fibers with which the aqueous binder for inorganic fibers is imparted are deposited on a perforated conveyor to form a bulky intermediate for a thermal and/or acoustical insulation material made of inorganic fiber (fiber collecting step). The intermediate is sent into the space between a set of perforated conveyors or the like that are vertically arranged at a distance so that the resultant has a desired thickness and heated with compression by pinching by the conveyors such that a desired thickness can be obtained to cure the aqueous binder for inorganic fibers, thereby forming a thermal and/or acoustical insulation material made of inorganic fiber (curing step). A facing material and the like may be applied as necessary, and then the thermal and/or acoustical insulation material made of inorganic fiber is cut to a desired width and length to obtain a product.

Hereinafter, each step is explained in more detail.

The inorganic fiber to be used for thermal and/or acoustical insulation material made of inorganic fiber of the present invention is not particularly limited and glass wool, rock wool, and the like that are used in ordinary thermal and/or acoustical insulation materials can be used. Examples of the method of fiberizing the inorganic fibers that can be used include various methods such as a flame attenuation method, a steam or air blowing method, and a centrifugal forming method (also referred to as a "rotary spin method"). In particular, when the inorganic fiber is glass wool, it is preferable that a centrifugal forming, method be used. Note that the target density of the thermal and/or acoustical insulation material made of inorganic fiber may be the density that is used for ordinary thermal insulation materials and acoustical insulation materials, and is preferably in the range of 5 to 300 $kg/m^3$.

To impart the inorganic fibers with the binder, a spraying apparatus or the like is used to apply or spray the binder. The amount of the binder to be imparted can be adjusted by a method similar to that for conventional binders containing no water repellent agent. The amount of the binder to be imparted may vary depending on the density and applications of the thermal and/or acoustical insulation material made of inorganic fiber, but is in the range of preferably 0.5 to 15 mass % and more preferably 0.5 to 9 mass %, as solids in accordance with the mass of the thermal and/or acoustical insulation material made of inorganic fiber in which the binder has been imparted.

The timing at which the binder is imparted to the thermal and/or acoustical insulation material made of inorganic fiber may be any time after the fiberization. However, to efficiently impart the binder, it is preferable that the binder be imparted immediately after the fiberization.

The inorganic fibers with which the binder is imparted by the above-mentioned step are deposited on a perforated conveyor to form a bulky inorganic fiber intermediate. Here, when the fibers are deposited on the perforated conveyor, it is preferable that the inorganic fibers are sucked by a suction unit from the side of the perforated conveyor opposite to the side where the inorganic fiber is deposited.

After that, the inorganic fiber intermediate continuously moving on the perforated conveyors is sent into the space between a set of perforated conveyors that are vertically arranged at a distance so that a desired thickness can be obtained, and at the same time the binder is cured with heated hot air and the thermal and/or acoustical insulation material made of inorganic fiber is molded into a mat, which is then cut to a desired width and length.

The temperature of the heat-curing of the binder is not particularly limited but is preferably 200 to 350° C. The time period of the heat-curing is adjusted as appropriate in a range of 30 seconds to 10 minutes depending on the density and thickness of the thermal and/or acoustical insulation material made of inorganic fiber.

The thermal and/or acoustical insulation material made of inorganic fiber of the present invention may be used in such form as it is. Alternatively, it can be used after it is covered with a facing material. Examples of the facing materials that can be used include paper, a synthetic resin film, a metal foil film, an unwoven fabric, a woven fabric, or combinations of these.

The thermal and/or acoustical insulation material made of inorganic fiber of the present invention thus obtained does not release formaldehyde when the binder is cured under heating and has less environmental loads as compared with conventional phenol/formaldehyde-based binders.

EXAMPLE

Hereinafter, the present invention is explained in more detail by way of examples. Note that in the following description, all parts and % are represented by mass unless otherwise indicated specifically.

Test Example 1

Thermal and/or acoustical insulation materials made of inorganic fiber using aqueous binders for inorganic fibers of Examples 1 to 13 below respectively were evaluated by the methods shown below for the property of recovering, the amount of released formaldehyde, and the tear load. The results obtained are shown in Table 1 below in summary.

Example 1

100 parts of amount in terms of solid content of a resin solution (having solid content of 35%) that was obtained by dissolving in water an acrylic resin consisting of styrene and maleic acid, the acid value of which is 710 mgKOH/g, and the weight average molecular weight of which is 14,000, 49.9 parts of diethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.0 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 15% to obtain an aqueous binder for inorganic fibers of Example 1.

Example 2

100 parts of amount in terms of solid content of a resin solution (having solid content of 40%) that was obtained by dissolving in water an acrylic resin consisting of acrylic acid, maleic acid, and methyl acrylate, the acid value of which is 690 mgKOH/g, and the weight average molecular weight of which is 1,500, 52.7 parts of diethanolamine as a crosslinking agent, and 6.0 parts of sodium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 6.5 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 15% and then added with 5.0 parts of amount in terms of solid content of an aqueous dispersion of paraffin wax having solid content of 40% to obtain an aqueous binder for inorganic fibers of Example 2.

Example 3

100 parts of amount in terms of solid content of a resin solution (having solid content of 45%) that was obtained by dissolving in water an acrylic resin consisting of acrylic acid, styrene, and methyl acrylate, the acid value of which is 380 mgKOH/g, and the weight average molecular weight of which is 7,800, 28.5 parts of di-n-propanolamine as a crosslinking agent, and 4.0 parts of tris(3-hydroxypropyl) phosphine as a curing accelerator were mixed so that the molar ratio of the total number of hydroxyl groups and imino groups in the crosslinking agent to the total number of carboxyl groups in the acrylic resin is 0.95:1, and adjusted with 25% ammonia water to pH 6.0 to obtain an aqueous composition. To the aqueous composition, 0.2 parts of γ-(2-aminoethyl)aminopropyltrimethoxysilane as a silane coupling agent was added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 3.

Example 4

100 parts of amount in terms of solid content of a resin solution (having solid content of 30%) that was obtained by dissolving in water an acrylic resin consisting of acrylic acid, styrene, and methyl acrylate, the acid value of which is 560 mgKOH/g, and the weight average molecular weight of which is 17,500, 38.4 parts of diethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.10:1, and adjusted with 25% ammonia water to pH 6.5 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 12% to obtain an aqueous binder for inorganic fibers of Example 4.

Example 5

100 parts of amount in terms of solid content of a resin solution (having solid content of 45%) that was obtained by dissolving in water an acrylic resin consisting of acrylic acid, maleic acid, and methyl acrylate, the acid value of which is 690 mgKOH/g, and the weight average molecular weight of which is 1,500, 30 parts of triethanolamine and 25.5 parts of diethanolamine as crosslinking agents, and 6.0 parts of sodium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.0 to obtain an aqueous composition. To the aqueous composition, 0.3 parts of γ-(2-aminoethyl)aminopropyltrimethoxysilane as a silane coupling agent was added, and the resultant was agitated. After the agitation, the resultant was diluted with water to have solid content of 15% and then added with 5.0 parts of amount in terms of solid content of an aqueous dispersion in which the ratio of olefin wax having solid content of 40% to heavy base oil having a viscosity grade of 320 mm$^2$/s is 1:1 in terms of solid content to obtain an aqueous binder for inorganic fibers of Example 5.

Example 6

100 parts of amount in terms of solid content of a resin solution (having solid content of 40%) that was obtained by dissolving in water an acrylic resin consisting of acrylic acid, styrene, and methyl acrylate, the acid value of which is 380 mgKOH/g, and the weight average molecular weight of which is 7,800, 35.5 parts of diethanolamine as a crosslinking agent, and 4.0 parts of tris(3-hydroxypropyl)phosphine as a curing accelerator were mixed so that the molar ratio of the total number of hydroxyl groups and imino groups in the crosslinking agent to the total number of carboxyl groups in the acrylic resin is 1.5:1, and adjusted with 25% ammonia water to pH 6.0 to obtain an aqueous composition. To the aqueous composition, 0.2 parts of γ-(2-aminoethyl)aminopropyltrimethoxysilane as a silane coupling agent was added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 6.

Example 7

100 parts of amount in terms of solid content of a resin solution (having solid content of 45%) that was obtained by dissolving in water an acrylic resin consisting of acrylic acid and methyl acrylate, the acid value of which is 630 mgKOH/g, and the weight average molecular weight of which is 3,900, 52.3 parts of di-n-propanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 7.0 to obtain an aqueous composition. To the aqueous composition, 0.2 parts of γ-(2-aminoethyl)aminopropyltrimethoxysilane as a silane coupling agent was added, and the resultant was agitated. After the agitation, the resultant was diluted with water to have solid content of 18% and then added with 4.0 parts of amount in terms of solid content of an aqueous dispersion of paraffin wax having solid content of 40% to obtain an aqueous binder for inorganic fibers of Example 7.

Example 8

100 parts of amount in terms of solid content of a resin solution (having solid content of 40%) that was obtained by dissolving in water an acrylic resin consisting of acrylic acid, maleic acid, and methyl acrylate, the acid value of which is 690 mgKOH/g, and the weight average molecular weight of which is 1,500, 74.8 parts of triethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 6.5 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 15% and then added with 5.0 parts of amount in terms of solid content of an aqueous dispersion of paraffin wax having solid content of 40% to obtain an aqueous binder for inorganic fibers of Example 8.

Example 9

100 parts of amount in terms of solid content of a resin solution (having solid content of 35%) that was obtained by dissolving in water an acrylic resin consisting of styrene and maleic acid, the acid value of which is 710 mgKOH/g, and the weight average molecular weight of which is 14,000, 49.1 parts of pentaerythritol as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.0 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 15% to obtain an aqueous binder for inorganic fibers of Example 9.

Example 10

100 parts of amount in terms of solid content of a resin solution (having solid content of 40%) that was obtained by dissolving in water an acrylic resin consisting of acrylic acid, styrene, and methyl acrylate, the acid value of which is 380 mgKOH/g, and the weight average molecular weight of which is 7,800, 47.3 parts of diethanolamine as a crosslinking agent, and 4.0 parts of tris(3-hydroxypropyl)phosphine as a curing accelerator were mixed so that the molar ratio of the total number of hydroxyl groups and imino groups in the crosslinking agent to the total number of carboxyl groups in the acrylic resin is 2.0:1, and adjusted with 25% ammonia water to pH 6.0 to obtain an aqueous composition. To the aqueous composition, 0.2 parts of γ-(2-aminoethyl)aminopropyltrimethoxysilane as a silane coupling agent was added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 10.

Example 11

100 parts of amount in terms of solid content of a resin solution (having solid content of 30%) that was obtained by dissolving in water an acrylic resin consisting of acrylic acid, styrene, and methyl acrylate, the acid value of which is 280 mgKOH/g, and the weight average molecular weight of which is 35,000, 19.2 parts of diethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.10:1, and adjusted with 25% ammonia water to pH 6.5 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 10% to obtain an aqueous binder for inorganic fibers of Example 11.

Example 12

100 parts of amount in terms of solid content of a colloidal dispersion (having solid content of 28%) that was obtained by neutralizing, with 25% ammonia water, an acrylic resin consisting of acrylic acid, styrene, and methyl acrylate, the acid value of which is 80 mgKOH/g, and the weight average molecular weight of which is 240,000, 5.5 parts of diethanolamine as a crosslinking agent, and 3.0 parts of calcium hypophosphite as a curing accelerator were mixed so that the molar ratio of the total number of hydroxyl groups and imino groups in the crosslinking agent to the total number of carboxyl groups in the acrylic resin is 1.10:1 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 10% to obtain an aqueous binder for inorganic fibers of Example 12.

Example 13

100 parts of amount in terms of solid content of a resol-type phenol resin precursor composition containing 10% or less of a monomer, 80% or more of a dimer, and 1% or less of free phenol that is dispersed in water, 0.2 parts of γ-(2-aminoethyl)aminopropyltrimethoxysilane as a silane coupling agent, 1.0 part of ammonium sulfate as a curing accelerator, and 450 parts of water were mixed in an open tank with a dissolver. While being agitated, the mixture was diluted with water to have solid content of 15% to obtain an aqueous binder for inorganic fibers of Example 13.

Evaluation of the Property of Recovering

The aqueous binders for inorganic fibers of Examples 1 to 13 were each applied, by way of spraying at a predetermined amount for attachment of the binder, onto the glass fiber that was fiberized using a centrifugal forming method. Then, while being sucked with a suction unit, the glass fiber was deposited on a perforated conveyor to form an intermediate of a thermal and/or acoustical insulation material made of inorganic fiber. Each of the intermediates was heated in hot air at 260° C. for 3 minutes to cure the binder to obtain a thermal and/or acoustical insulation material made of inorganic fiber, which is glass wool having a density of 16 Kg/m$^3$, a thickness of 100 mm, and a binder attachment amount of 3.0%. Then, the glass wool was compressed until the thickness of the glass wool was decreased to ⅛ and placed in a low-density polyethylene bag. In this state, the glass wool was left to stand under an environment of a temperature of 40° C. and a humidity of 95%. On day 1, 14 and 28, each bag was opened and the recovered thickness of the glass wool was measured, and was evaluated in comparison with the initial thickness of the glass wool.

Evaluation of the Amount of Formaldehyde Released

The gases, which had been generated when the binders for the glass wools used in the above-mentioned evaluation of the property of recovering were cured, had been each collected in a 4-liter odor bag and measured for the amount of formaldehyde released by using a gas detector.

When the glass wool obtained using the phenol-based binder of Example 13 was cured, 40 ppm of formaldehyde was detected. On the other hand, when the glass wool obtained using the binder containing an acrylic resin in any of Examples 1 to 12 was cured, no formaldehyde was detected.

Evaluation of the Tear Load

The aqueous binders for inorganic fibers of Examples 1 to 13 were each applied, by way of spraying at a predetermined amount for attachment of the binder, onto the glass fiber that was fiberized using a centrifugal forming method. Then, while being sucked with a suction unit, the glass fiber was deposited on a perforated conveyor to form an intermediate of a thermal and/or acoustical insulation material made of inorganic fiber. Each of the intermediates was heated in hot air at 260° C. for 5 minutes to cure the binder to obtain a thermal and/or acoustical insulation material made of inorganic fiber, which is a glass wool board having a density of 32 Kg/m$^3$, a length of 1,350 mm, a width of 430 mm, a thickness of 50 mm, and a binder attachment amount of 6.0%. Then, each of the 32 Kg/m$^3$ glass wool boards was clamped at the edge portion thereof in a thickness direction by a chuck of a universal testing machine and measured for the tear load at a speed of 1 m/minute. Note that in the case of the glass wool board in which the binder of Example 11 was used, contamination due to the stickiness of the binder and attachment of the inorganic fibers were observed in large amounts on the perforated conveyor that was used for forming the intermediate of the thermal and/or acoustical insulation material made of inorganic fiber. Further, in the case of the glass wool board in which the binder of Example 12 was used, attachment of a thin layer of the inorganic fiber was observed on the conveyor when the glass wool was cured.

TABLE 1

|  |  | Example 1 | Example 2 | Example 3 | Example 4 | Example 5 | Example 6 | Example 7 |
|---|---|---|---|---|---|---|---|---|
| Recovering | Initial thickness (mm) | 100.5 | 101.2 | 104.5 | 100.8 | 101.3 | 105.4 | 107.8 |
|  | Day 1 (mm) | 100.5 | 101.0 | 104.6 | 100.8 | 101.2 | 104.6 | 107.5 |
|  | Day 14 (mm) | 100.2 | 100.9 | 105.4 | 100.5 | 100.9 | 104.3 | 106.4 |
|  | Day 28 (mm) | 100.3 | 100.5 | 105.2 | 100.2 | 100.9 | 104.2 | 106.4 |
|  | Formaldehyde Release Amount (ppm) | Not detected | Not detected | Not detected | Not detected | Not detected | Not detected | Not detected |
|  | Tear Load (kgf) | 14.5 | 14.7 | 12.8 | 13.4 | 14.8 | 13.1 | 14.0 |

|  |  | Example 8* | Example 9* | Example 10* | Example 11* | Example 12* | Example 13* |
|---|---|---|---|---|---|---|---|
| Recovering | Initial thickness (mm) | 105.4 | 100.8 | 104.6 | 108.4 | 118.9 | 108.4 |
|  | Day 1 (mm) | 104.6 | 99.7 | 97.5 | 92.5 | 115.8 | 104.5 |
|  | Day 14 (mm) | 124.5 | 118.5 | 96.1 | 87.5 | 124.8 | 103.4 |
|  | Day 28 (mm) | 135.7 | 127.4 | 93.4 | 83.4 | 137.4 | 102.4 |
|  | Formaldehyde Release Amount (ppm) | Not detected | Not detected | Not detected | Not detected | Not detected | 40 |
|  | Tear Load (kgf) | 14.5 | 13.8 | 9.4 | 8.7 | 4.6 | 14.8 |

Symbol "*" indicates that examples are outside the scope of the present invention.

The above-mentioned results indicate the followings.

The thermal and/or acoustical insulation material made of inorganic fiber in which the aqueous binder for inorganic fibers of Examples 8 or 9 was used had performance with respect to the tear load equivalent to those of Examples 1 to 7 whereas the thickness of the material tended to increase with passage of days and the adhesion for the fibers with the binder tended to be deteriorated with time under at high temperature and high humidity, thus exhibiting poor property of recovering.

In the thermal and/or acoustical insulation material made of inorganic fiber in which the binder of Example 10 was used, an excessive crosslinking component adversely influenced the characteristics in moisture absorption of the material, thus exhibiting poor tear strength as compared with those of Examples 1 to 7. Further, the thickness of the thermal and/or acoustical insulation material made of inorganic fiber tended to increase with passage of days, thus exhibiting poor property of recovering.

In the thermal and/or acoustical insulation material made of inorganic fiber in which the aqueous binder for inorganic fibers of Examples 11 or 12 was used, with an acid value of the acrylic resin outside the range of that of the present invention, the crosslinking density of the binder is insufficient to give sufficient strength, thus exhibiting poor tear strength and poor property of recovering as compared with those of Examples 1 to 7. In particular, the thermal and/or acoustical insulation material made of inorganic fiber in which the aqueous binder for inorganic fibers to example 12 was used showed a stickiness of the binder and the inorganic fibers to the curing conveyor upon production, which suggested that film-forming property, which is the characteristic of the colloidal dispersion, first performed. Thus, the material had extremely poor property of recovering and tear strength.

On the other hand, the thermal and/or acoustical insulation material made of inorganic fiber in which any of the aqueous binder for inorganic fibers of Examples 1 to 7 was used did not release formaldehyde when the binder was cured, and had a property of recovering and a tear strength equivalent to those of the thermal and/or acoustical insulation material made of inorganic fiber of Example 13 in which a phenol resin-based binder was used. Among them, each of the materials of Examples 1, 2, and 5, each obtained by using acrylic resins whose acid values were around 700 mgKOH/g, had high tear strength.

Test Example 2

Thermal and/or acoustical insulation materials made of inorganic fiber using aqueous binders for inorganic fibers of Examples 14 to 27 below respectively were evaluated by the methods shown below for the amount of released formaldehyde and the tear load. The results obtained are shown in Table 2 below in summary.

Example 14

100 parts of amount in terms of solid content of a resin solution (having solid content of 45%) that was obtained by dissolving in water an acrylic resin consisting of acrylic acid and methyl acrylate, the acid value of which is 690 mgKOH/g, and the weight average molecular weight of which is 2,000, 52.7 parts of diethanolamine as a crosslinking agent, and 6.0 parts of sodium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 6.5 to obtain an aqueous composition. To the aqueous composition, 0.3 parts of γ-aminopropyltriethoxysilane as a silane coupling agent and 2.0 parts of ammonium sulfate were added, and the resultant was agitated. After the agitation, the resultant was diluted with water to have solid content of 15% and then added with 5.0 parts of amount in terms of solid content of an aqueous dispersion of paraffin wax having solid content of 40% to obtain an aqueous binder for inorganic fibers of Example 14.

Example 15

100 parts of amount in terms of solid content of a resin solution (having solid content of 35%) that was obtained by dissolving in water an acrylic resin consisting of styrene and maleic acid, the acid value of which is 710 mgKOH/g, and the weight average molecular weight of which is 14,000, 49.9 parts of diethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.0 to obtain an aqueous composition. To the aqueous composition, 0.3 parts of γ-aminopropyltriethoxysilane as a silane coupling agent and 3.0 parts of ammonium sulfate were added, and the resultant was agitated. After the agitation, the resultant was diluted with water to have solid content of 15% to obtain an aqueous binder for inorganic fibers of Example 15.

Example 16

100 parts of amount in terms of solid content of a resin solution (having solid content of 45%) that was obtained by dissolving in water an acrylic resin consisting of acrylic acid, styrene, and methyl acrylate, the acid value of which is 380 mgKOH/g, and the weight average molecular weight of which is 7,800, 28.5 parts of diisopropanolamine as a crosslinking agent, and 4.0 parts of tris(3-hydroxypropyl)phosphine as a curing accelerator were mixed so that the molar ratio of the total number of hydroxyl groups and imino groups in the crosslinking agent to the total number of carboxyl groups in the acrylic resin is 0.95:1, and adjusted with 25% ammonia water to pH 6.0 to obtain an aqueous composition. To the aqueous composition, 0.2 parts of γ-(2-aminoethyl)aminopropyltrimethoxysilane as a silane coupling agent and 1.5 parts of ammonium sulfate were added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 16.

Example 17

100 parts of amount in terms of solid content of a resin solution (having solid content of 30%) that was obtained by dissolving in water an acrylic resin consisting of acrylic acid, styrene, and methyl acrylate, the acid value of which is 560 mgKOH/g, and the weight average molecular weight of which is 17,500, 38.4 parts of diethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.10:1, and adjusted with 25% ammonia water to pH 6.5 to obtain an aqueous composition. To the aqueous composition, 0.3 parts of γ-aminopropyltriethoxysilane as a silane coupling agent and 2.0 parts of ammonium sulfate were added, and the resultant was agitated. After the agitation, the resultant was diluted with water to have solid content of 12% to obtain an aqueous binder for inorganic fibers of Example 17.

Example 18

100 parts of amount in terms of solid content of a resin solution (having solid content of 45%) that was obtained by dissolving in water an acrylic resin consisting of acrylic acid and methyl acrylate, the acid value of which is 690 mgKOH/ g, and the weight average molecular weight of which is 1,500, 30 parts of triethanolamine and 25.5 parts of diethanolamine as crosslinking agents, and 6.0 parts of sodium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.0 to obtain an aqueous composition. To the aqueous composition, 0.3 parts of γ-(2-aminoethyl) aminopropyltrimethoxysilane as a silane coupling agent and 3.0 parts of ammonium metaphosphate were added, and the resultant was agitated. After the agitation, the resultant was diluted with water to have solid content of 15% and then added with 5.0 parts of amount in terms of solid content of an aqueous dispersion in which the ratio of olefin wax having solid content of 40% to heavy base oil having a viscosity grade of 320 $mm^2/s$ is 1:1 in terms of solid content to obtain an aqueous binder for inorganic fibers of Example 18.

Example 19

100 parts of amount in terms of solid content of a resin solution (having solid content of 40%) that was obtained by dissolving in water an acrylic resin consisting of acrylic acid, styrene, and methyl acrylate, the acid value of which is 380 mgKOH/g, and the weight average molecular weight of which is 7,800, 35.5 parts of diethanolamine as a crosslinking agent, and 4.0 parts of tris(3-hydroxypropyl)phosphine as a curing accelerator were mixed so that the molar ratio of the total number of hydroxyl groups and imino groups in the crosslinking agent to the total number of carboxyl groups in the acrylic resin is 1.5:1, and adjusted with 25% ammonia water to pH 6.0 to obtain an aqueous composition. To the aqueous composition, 0.2 parts of γ-(2-aminoethyl)aminopropyltrimethoxysilane as a silane coupling agent and 2.0 parts of ammonium sulfate were added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 19.

Example 20

100 parts of amount in terms of solid content of a resin solution (having solid content of 40%) that was obtained by dissolving in water a mixture of; 80% of an acrylic resin consisting of acrylic acid and methyl acrylate, the acid value of which is 640 mgKOH/g, and the weight average molecular weight of which is 2,200; and 20% of an acrylic resin consisting of styrene and maleic acid, the acid value of which is 710 mgKOH/g, and the weight average molecular weight of which is 17,500, 40.8 parts of diethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.5 to obtain an aqueous composition. To the aqueous composition, 0.2 parts of γ-(2-aminoethyl)aminopropyltrimethoxysilane as a silane coupling agent and 2.0 parts of ammonium sulfate were added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 20.

Example 21

100 parts of amount in terms of solid content of a resin solution (having solid content of 40%) that was obtained by dissolving in water an acrylic resin consisting of acrylic acid and methyl acrylate, the acid value of which is 690 mgKOH/g, and the weight average molecular weight of which is 1,500, 74.8 parts of triethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 6.5 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 15% and then added with 5.0 parts of amount in terms of solid content of an aqueous dispersion of paraffin wax having solid content of 40% to obtain an aqueous binder for inorganic fibers of Example 21.

Example 22

100 parts of amount in terms of solid content of a resin solution (having solid content of 40%) that was obtained by dissolving in water an acrylic resin consisting of acrylic acid and methyl acrylate, the acid value of which is 690 mgKOH/g, and the weight average molecular weight of which is 1,500, 74.8 parts of triethanolamine as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 6.5 to obtain an aqueous composition. To the aqueous composition, 0.3 parts of γ-aminopropyltriethoxysilane as a silane coupling agent and 2.0 parts of ammonium sulfate were added, and the resultant was agitated. After the agitation, the resultant was diluted with water to have solid content of 15% and then added with 5.0 parts of amount in terms of solid content of an aqueous dispersion of paraffin wax having solid content of 40% to obtain an aqueous binder for inorganic fibers of Example 22.

Example 23

100 parts of amount in terms of solid content of a resin solution (having solid content of 35%) that was obtained by dissolving in water an acrylic resin consisting of styrene and maleic acid, the acid value of which is 710 mgKOH/g, and the weight average molecular weight of which is 14,000, 49.1 parts of pentaerythritol as a crosslinking agent, and 6.0 parts of calcium hypophosphite as a curing accelerator were mixed so that the molar ratio of the total number of hydroxyl groups and imino groups in the crosslinking agent to the total number of carboxyl groups in the acrylic resin is 1.0:1, and adjusted with 25% ammonia water to pH 6.0 to obtain an aqueous composition. To the aqueous composition, 0.3 parts of γ-aminopropyltriethoxysilane as a silane coupling agent and 2.0 parts of ammonium sulfate were added, and the resultant was agitated. After the agitation, the resultant was diluted with water to have solid content of 15% to obtain an aqueous binder for inorganic fibers of Example 23.

Example 24

100 parts of amount in terms of solid content of a resin solution (having solid content of 40%) that was obtained by dissolving in water an acrylic resin consisting of acrylic acid, styrene, and methyl acrylate, the acid value of which is 380 mgKOH/g, and the weight average molecular weight of which is 7,800, 47.3 parts of diethanolamine as a crosslinking agent, and 4.0 parts of tris(3-hydroxypropyl)phosphine as a curing accelerator were mixed so that the molar ratio of the total number of hydroxyl groups and imino groups in the crosslinking agent to the total number of carboxyl groups in the acrylic resin is 2.0:1, and adjusted with 25% ammonia water to pH 6.0 to obtain an aqueous composition. To the aqueous composition, 0.2 parts of γ-(2-aminoethyl)aminopropyltrimethoxysilane as a silane coupling agent and 2.0 parts of ammonium sulfate were added, and the resultant was agitated. After the agitation, the resultant was diluted with water to have solid content of 15% and then added with 4.0 parts of amount in terms of solid content of an aqueous dispersion of paraffin wax having solid content of 40% to obtain an aqueous binder for inorganic fibers of Example 24.

Example 25

100 parts of amount in terms of solid content of a resin solution (having solid content of 45%) that was obtained by dissolving in water an acrylic resin consisting of acrylic acid and methyl acrylate, the acid value of which is 690 mgKOH/g, and the weight average molecular weight of which is 2,000, 52.7 parts of diethanolamine as a crosslinking agent, and 6.0 parts of sodium hypophosphite as a curing accelerator were mixed so that the molar ratio of the total number of hydroxyl groups and imino groups in the crosslinking agent to the total number of carboxyl groups in the acrylic resin is 1.05:1, and adjusted with 25% ammonia water to pH 6.5 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 15% and then added with 5.0 parts of amount in terms of solid content of an aqueous dispersion of paraffin wax having solid content of 40% to obtain an aqueous binder for inorganic fibers of Example 25.

Example 26

100 parts of amount in terms of solid content of a colloidal dispersion (having solid content of 28%) that was obtained by neutralizing, with 25% ammonia water, an acrylic resin consisting of acrylic acid, styrene, and methyl acrylate, the acid value of which is 80 mgKOH/g, and the weight average molecular weight of which is 240,000, 5.5 parts of diethanolamine as a crosslinking agent, and 3.0 parts of calcium hypophosphite as a curing accelerator were mixed so that the molar ratio of the total number of hydroxyl groups and imino groups in the crosslinking agent to the total number of carboxyl groups in the acrylic resin is 1.10:1 to obtain an aqueous composition. To the aqueous composition, 0.3 parts of γ-aminopropyltriethoxysilane as a silane coupling agent was added, and the resultant was agitated. After the agitation, the resultant was diluted with water to have solid content of 10% to obtain an aqueous binder for inorganic fibers of Example 26.

Example 27

100 parts of amount in terms of solid content of a resol-type phenol resin precursor composition containing 10% or less of a monomer, 80% or more of a dimer, and 1% or less of free phenol that is dispersed in water, 0.2 parts of γ-(2-aminoethyl) aminopropyltrimethoxysilane as a silane coupling agent, 2.0 part of ammonium sulfate as a curing accelerator and/or a neutralizer for alkaline components of inorganic fibers, and 450 parts of water were mixed in an open tank with a dissolver. While being agitated, the mixture was diluted with water to have solid content of 15% to obtain an aqueous binder for inorganic fibers of Example 27.

Evaluation of the Amount of Formaldehyde Released

The aqueous binders for inorganic fibers of Examples 14 to 27 were each applied, by way of spraying at a predetermined amount for attachment of the binder, onto the glass fiber that was fiberized using a centrifugal forming method. Then, while being sucked with a suction unit, the glass fiber was deposited on a perforated conveyor to form an intermediate of a thermal and/or acoustical insulation material made of inorganic fiber. Each of the intermediates was heated in hot air at 260° C. for 3 minutes to cure the binder to obtain a thermal and/or acoustical insulation material made of inorganic fiber, which is glass wool having a density of 16 Kg/m$^3$, a thickness of 100 mm, and a binder attachment amount of 3.0%.

The gases generated when the binders were cured for preparation of the above-mentioned glass wools were each collected in a 4-liter odor bag and measured for the amount of formaldehyde released by using a gas detector.

When the glass wool obtained using the phenol-based binder of Example 27 was cured, 40 ppm of formaldehyde was detected. On the other hand, when the glass wool obtained using the binder containing an acrylic resin in any of Examples 14 to 26 was cured, no formaldehyde was detected.

Evaluation of the Tear Load

The aqueous binders for inorganic fibers of Examples 14 to 27 were each applied, by way of spraying at a predetermined amount for attachment of the binder, onto the glass fiber that was fiberized using a centrifugal forming method. Then, while being sucked with a suction unit, the glass fiber was deposited on a perforated conveyor to form an intermediate of a thermal and/or acoustical insulation material made of inorganic fiber. Each of the intermediates was heated in hot air at 260° C. for 5 minutes to cure the binder to obtain a thermal and/or acoustical insulation material made of inorganic fiber, which is a glass wool board having a density of 32 Kg/m$^3$, a length of 1,350 mm, a width of 430 mm, a thickness of 50 mm, and a binder attachment amount of 6.0%. Then, each of the 32 Kg/m$^3$ glass wool boards was clamped at the edge portion thereof in a thickness direction by a chuck of a universal testing machine and measured for tear load at a speed of 1 m/minute.

Further, the thermal and/or acoustical insulation material made of inorganic fiber obtained by way of molding using the aqueous binders for inorganic fibers of Examples 14 to 27 were each left to stand under conditions of a temperature of 40° C. and a humidity of 95% for 4 weeks, and then evaluation similar to the above was made.

Note that in the case of the glass wool board in which the binder of Example 26 was used, attachment of a thin layer of the inorganic fiber was observed on the conveyor when the glass wool was cured.

TABLE 2

|  | Example 14 | Example 15 | Example 16 | Example 17 | Example 18 | Example 19 | Example 20 |
|---|---|---|---|---|---|---|---|
| Formaldehyde Release Amount (ppm) | Not detected | Not detected | Not detected | Not detected | Not detected | Not detected | Not detected |
| Tear Load (kgf) | 14.6 | 13.9 | 14.7 | 13.6 | 14.1 | 14.6 | 13.4 |
| Tear Load (kgf) after standing at 40° C. and 95% for 4 weeks | 13.2 | 12.8 | 13.9 | 12.6 | 13.2 | 13.9 | 12.9 |

|  | Example 21* | Example 22* | Example 23* | Example 24* | Example 25 | Example 26* | Example 27* |
|---|---|---|---|---|---|---|---|
| Formaldehyde Release Amount (ppm) | Not detected | Not detected | Not detected | Not detected | Not detected | Not detected | 40 |
| Tear Load (Kgf) | 13.8 | 13.2 | 9.4 | 11.5 | 14.6 | 5.2 | 14.8 |
| Tear Load (kgf) after standing at 40° C. and 95% for 4 weeks | 8.6 | 8.9 | 6.1 | 9.4 | 8.7 | 3.2 | 12.5 |

Symbol "*" indicates that examples are outside the scope of the present invention.

The above-mentioned results indicate the followings.

The thermal and/or acoustical insulation material made of inorganic fiber in which the aqueous binder for inorganic fibers of Examples 21 or 22 was used exhibited deteriorated adhesion for the fibers with the binder with lapse of time. Note that in Example 22, to neutralize the alkaline component eluted from the inorganic fiber to the binder, the binder contained an ammonium salt of an inorganic acid. Evaluated of the result from Example 22 exhibiting poor tear strength under at high temperature and high humidity, suggests that curing was not completely achieved in the binder of Example 22.

The thermal and/or acoustical insulation material made of inorganic fiber in which the aqueous binder for inorganic fibers of Example 23 was used contained pentaerythritol having four hydroxyl groups and having no imino group as a crosslinking agent and hence the reaction between the carboxyl groups and the hydroxyl groups became moderate under weakly acidic to weakly basic conditions, so that the crosslinking reaction hardly occurred. As a result, the obtained material had poor tear strength. Further, the adhesion for the fibers was deteriorated with time as days passed under at high temperature and high humidity.

In the thermal and/or acoustical insulation material made of inorganic fiber in which the binder of Example 24 was used, an excessive crosslinking component adversely influenced the characteristics in moisture absorption of the material, thus exhibiting poor strength load as compared with those of Examples 14 to 20. Further, the adhesion for the fibers was deteriorated with time as days passed under at high temperature and high humidity.

In the thermal and/or acoustical insulation material made of inorganic fiber in which the aqueous binder for inorganic fibers of Example 25 similar to the binder of Example 14 but does not contain ammonium salt of inorganic acid therein was used, the tear load thereof tended to be decreased with time as days passed under at high temperature and high humidity.

The thermal and/or acoustical insulation material made of inorganic fiber in which the aqueous binder for inorganic fibers to example 26 was used showed a stickiness of the binder and the inorganic fibers to the curing conveyor upon production, which suggested that film-forming property, which is the characteristic of the colloidal dispersion, first performed. Thus, the material had extremely poor tear strength.

On the other hand, the thermal and/or acoustical insulation material made of inorganic fiber in which any of the aqueous binder for inorganic fibers of Examples 14 to 20 was used did not release formaldehyde when the binder was cured, and had a tear strength equivalent to that of the thermal and/or acoustical insulation material made of inorganic fiber of Example 27 in which a phenol resin-based binder was used.

INDUSTRIAL APPLICABILITY

The aqueous binder for inorganic fibers according to the present invention contains no formaldehyde at all, so it imposes less environmental loads and can be used for preparation of thermal and/or acoustical insulation materials made of inorganic fiber, which can be advantageously used as a thermal insulation material and/or an acoustical insulation material for houses and buildings.

The invention claimed is:

1. An aqueous binder comprising:
   an acrylic resin with an acid value of 350 to 850 mgKOH/g;
   a crosslinking agent comprising at least one dialkanolamine; and
   a curing accelerator,
   wherein a molar ratio of the total number of hydroxyl groups and imino groups in the crosslinking agent to the total number of carboxyl groups in the acrylic resin ranges from 0.8:1 to 1.5:1, and wherein the pH of the binder is adjusted to 6.0 to 8.0 with a volatile basic compound;
   further comprising an aqueous dispersion that contains a wax or a wax mixed with a heavy base oil, wherein an amount in terms of solid content of the aqueous dispersion contained in the binder ranges from 0.1 to 5 parts by mass per a total of 100 parts by mass of the acrylic resin and the crosslinking agent.

2. The aqueous binder according to claim 1, wherein the acrylic resin has a weight average molecular weight of 1,000 to 15,000.

3. The aqueous binder according to claim 1, wherein the acrylic resin comprises a mixture of an acrylic resin (A) having a weight average molecular weight of 1,000 to 4,000 and an acrylic resin (B) having a weight average molecular weight of 8,000 to 20,000.

4. The aqueous binder according to claim 1, further comprising a silane coupling agent, wherein an amount of the silane coupling agent contained in the binder ranges from 0.1 to 2.0 parts by mass per a total of 100 parts by mass of the acrylic resin and the crosslinking agent.

5. The aqueous binder according to claim 1, further comprising an ammonium salt of an inorganic acid.

6. The aqueous binder according to claim 5, wherein the ammonium salt of the inorganic acid is ammonium sulfate.

7. A molded composite comprising inorganic fiber(s) and the binder of claim 1, wherein the binder has been applied to the inorganic fiber(s) and cured by heating.

8. The molded composite of claim 7, wherein the binder is sprayed on the inorganic fiber.

9. A thermal and/or acoustical insulation material comprising the molded composite of claim 7.

10. The aqueous binder according to claim 1, wherein the acid value ranges from 380 to 710 mgKOH/g.

11. The aqueous binder according to claim 1, wherein the molar ratio of the total number of hydroxyl groups and imino groups in the crosslinking agent to the total number of carboxyl groups in the acrylic resin ranges from 0.95:1 to 1.5:1.

12. The aqueous binder according to claim 1, wherein the acrylic resin has a weight average molecular weight ranging from 1,500 to 14,000.

13. The aqueous binder according to claim 1, wherein the aqueous binder does not release formaldehyde when cured.

* * * * *